United States Patent
Weksler et al.

(10) Patent No.: US 10,484,321 B2
(45) Date of Patent: Nov. 19, 2019

(54) APPARATUS, METHOD, AND PROGRAM PRODUCT FOR BLOCKING GROUP MESSAGE REPLIES

(71) Applicant: LENOVO (Singapore) PTE. LTD., New Tech Park (SG)

(72) Inventors: Arnold S. Weksler, Raleigh, NC (US); John Carl Mese, Cary, NC (US); Nathan J. Peterson, Oxford, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 290 days.

(21) Appl. No.: 15/076,230

(22) Filed: Mar. 21, 2016

(65) Prior Publication Data
US 2017/0272392 A1 Sep. 21, 2017

(51) Int. Cl.
*H04L 12/58* (2006.01)

(52) U.S. Cl.
CPC .................... *H04L 51/12* (2013.01)

(58) Field of Classification Search
CPC ......... H04L 51/12; H04L 51/36; H04L 51/38; H04L 67/1044; H04L 67/306; H04L 63/0227; H04L 63/0245; H04L 63/0263; H04L 65/1079
See application file for complete search history.

(56) References Cited

U.S. PATENT DOCUMENTS

| | | | | |
|---|---|---|---|---|
| 5,872,925 | A * | 2/1999 | Han | G06Q 10/107 709/206 |
| 7,720,919 | B2 * | 5/2010 | Khouri | H04L 51/00 709/204 |
| 7,877,448 | B2 * | 1/2011 | Janakiraman | G06Q 10/107 709/201 |
| 8,055,718 | B2 * | 11/2011 | Slaybers | H04L 51/28 709/206 |
| 8,401,009 | B1 * | 3/2013 | Dorsey | H04L 51/066 370/389 |
| 8,667,069 | B1 * | 3/2014 | Connelly | H04L 51/32 709/206 |
| 2003/0008674 | A1 * | 1/2003 | Cudak | H04W 8/186 455/466 |
| 2005/0071239 | A1 * | 3/2005 | Tormey | G06Q 30/06 705/26.43 |
| 2008/0046478 | A1 * | 2/2008 | Mandre | G06Q 10/00 |
| 2010/0174785 | A1 * | 7/2010 | Cai | H04L 51/12 709/206 |
| 2011/0213852 | A1 * | 9/2011 | Radenkovic | G06Q 10/107 709/206 |

(Continued)

OTHER PUBLICATIONS

Kyli Singh ("How to Get Out of Annoying Group Texts in iOS 8", Sep. 25, 2014, Appearing in web link https://web.archive.org/web/20140927054405/http://mashable.com/2014/09/25/ios-8-group-texts/. (Year: 2014).*

(Continued)

*Primary Examiner* — Imad Hussain
*Assistant Examiner* — Sandarva Khanal
(74) *Attorney, Agent, or Firm* — Kunzler Bean & Adamson (57) ABSTRACT

Apparatuses, methods, and program products are disclosed for blocking group message replies. One method includes, receiving, by use of a processor, an indication at a client application to block the client application from receiving replies to a group message. The method may also include blocking the client application from receiving the replies to the group message.

23 Claims, 6 Drawing Sheets

(56) References Cited

U.S. PATENT DOCUMENTS

| | | | | | |
|---|---|---|---|---|---|
| 2012/0198017 | A1* | 8/2012 | LeVasseur | ............... | H04L 51/24 |
| | | | | | 709/206 |
| 2012/0331399 | A1* | 12/2012 | Eidelson | ........... | H04M 1/72552 |
| | | | | | 715/753 |
| 2015/0072715 | A1* | 3/2015 | Ireland | .................... | H04W 4/14 |
| | | | | | 455/466 |
| 2016/0380937 | A1* | 12/2016 | Murphy | ................. | H04L 51/08 |
| | | | | | 709/206 |

OTHER PUBLICATIONS

Palmetto Technology Group ("How to Prevent and Opt Out of Reply All Messages", Oct. 22, 2015, Appearing in web link http://blog.goptg.com/blog/2015/10/22/how-to-stop-and-opt-out-of-reply-all-messages. (Year: 2015).*

Karyne Levy, "How to Leave a Group Message in iOS 8". Oct. 22, 2014. Retrieved from online website https://web.archive.org/web/20141112161510/https://www.businessinsider.com.au/how-to-leave-a-group-messages-in-ios-Aug. 2014-10 (Year: 2014).*

Jordyn Taylor, "This App Lets You Secretly Leave Annoying Group Texts", Apr. 4, 2014. Appearing in web link https://observer.com/2014/04/this-app-lets-you-secretly-leave-annoying-group-texts/ (Year: 2014).*

Fahah Saleem, "Leave WhatsApp Group Secretly Without Notification and Delete WhatsApp Group Without Leaving Group [Guide]",Mar. 12, 2015) (Year: 2015).*

Dave Taylor, "How can I quit a group chat in Facebook?"Jan. 5, 2015. Appearing in web link https://www.askdavetaylor.com/can-quit-group-chat-facebook/. (Year: 2015).*

Viveknayyar007, "Stop Incoming Messages from Specific Users in Group Chat (iOS 8)", Dec. 18, 2014, Appearing in web link http://www.tomsguide.com/faq/id-2354934/stop-incoming-messages-specific-users-group-chat-ios.html. (Year: 2014).*

* cited by examiner

APPARATUS, METHOD, AND PROGRAM PRODUCT FOR BLOCKING GROUP MESSAGE REPLIES

FIELD

The subject matter disclosed herein relates to group messages and more particularly relates to blocking group message replies.

BACKGROUND

Description of the Related Art

Information handling devices, such as desktop computers, laptop computers, tablet computers, smart phones, optical head-mounted display units, smart watches, etc., are ubiquitous in society. Messages may be sent and received using information handling devices. Undesirable messages may be received by information handling devices.

BRIEF SUMMARY

An apparatus for blocking group message replies is disclosed. A method and computer program product also perform the functions of the apparatus. In one embodiment, the apparatus includes a processor and a memory that stores code executable by the processor. The code, in various embodiments, is executable by the processor to receive an indication at a client application to block the client application from receiving replies to a group message. In a further embodiment, the code is executable by the processor to block the client application from receiving the replies to the group message.

In some embodiments, the code executable by the processor to receive the indication at the client application to block the client application from receiving replies to the group message includes code executable by the processor to receive a selection at an input associated with the group message. In various embodiments, the code executable by the processor to block the client application from receiving the replies to the group message includes code executable by the processor to remove a user account associated with the client application from a recipient list of the group message.

In another embodiment, the code executable by the processor to block the client application from receiving the replies to the group message includes code executable by the processor to add a user account associated with the client application to an exclude list corresponding to the group message.

A method for blocking group message replies, in one embodiment, includes receiving, by use of a processor, an indication at a client application to block the client application from receiving replies to a group message. In some embodiments, the method includes blocking the client application from receiving the replies to the group message.

In some embodiments, receiving the indication at the client application to block the client application from receiving replies to the group message includes receiving a selection at an input associated with the group message. In various embodiments, receiving the indication at the client application to block the client application from receiving replies to the group message includes receiving a selection at an input toolbar of a received email message. In certain embodiments, receiving the indication at the client application to block the client application from receiving replies to the group message includes receiving a selection of a setting of a received text message.

In some embodiments, blocking the client application from receiving the replies to the group message includes removing a user account associated with the client application from a recipient list of the group message. In certain embodiments, blocking the client application from receiving the replies to the group message includes adding a user account associated with the client application to an exclude list corresponding to the group message. In various embodiments, blocking the client application from receiving the replies to the group message includes sending the indication to a server application to direct the server application to remove a user account associated with the client application from a recipient list of the group message.

In certain embodiments, blocking the client application from receiving the replies to the group message includes sending the indication to a server application to direct the server application to add a user account associated with the client application to an exclude list corresponding to the group message. In some embodiments, blocking the client application from receiving the replies to the group message includes sending the indication to a second client application to direct the second client application to remove a user account associated with the client application from a recipient list of the group message.

In various embodiments, blocking the client application from receiving the replies to the group message includes sending the indication to a second client application to direct the second client applications to add a user account associated with the client application to an exclude list corresponding to the group message. In some embodiments, blocking the client application from receiving the replies to the group message includes sending the indication to multiple client applications to direct the multiple client applications to remove a user account associated with the client application from a recipient list of the group message. In such embodiments, sending the indication to the multiple client applications includes directing the multiple client applications to notify the recipient list of the group message that the user account is removed from the group message.

In certain embodiments, sending the indication to the multiple client applications includes directing the multiple client applications to block notification of the recipient list of the group message that the user account is removed from the group message. In some embodiments, blocking the client application from receiving the replies to the group message includes sending the indication to multiple client applications to direct the multiple client applications to add a user account associated with the client application to an exclude list corresponding to the group message.

In one embodiment, a program product includes a computer readable storage medium that stores code executable by a processor. The executable code, in certain embodiments, includes code to perform receiving an indication at a client application to block the client application from receiving replies to a group message. In a further embodiment, the executable code includes code to perform blocking the client application from receiving the replies to the group message.

In certain embodiments, the code to perform blocking the client application from receiving the replies to the group message includes code to perform removing a user account associated with the client application from a recipient list of the group message.

Another method for blocking group message replies, in one embodiment, includes receiving, by use of a processor, an indication from a client application to block the client application from receiving replies to a group message. In some embodiments, the method includes blocking the client application from receiving the replies to the group message.

In one embodiment, receiving the indication from the client application includes receiving, at a server application, the indication from the client application. In another embodiment, receiving the indication from the client application includes receiving, at an additional client application, the indication from the client application.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
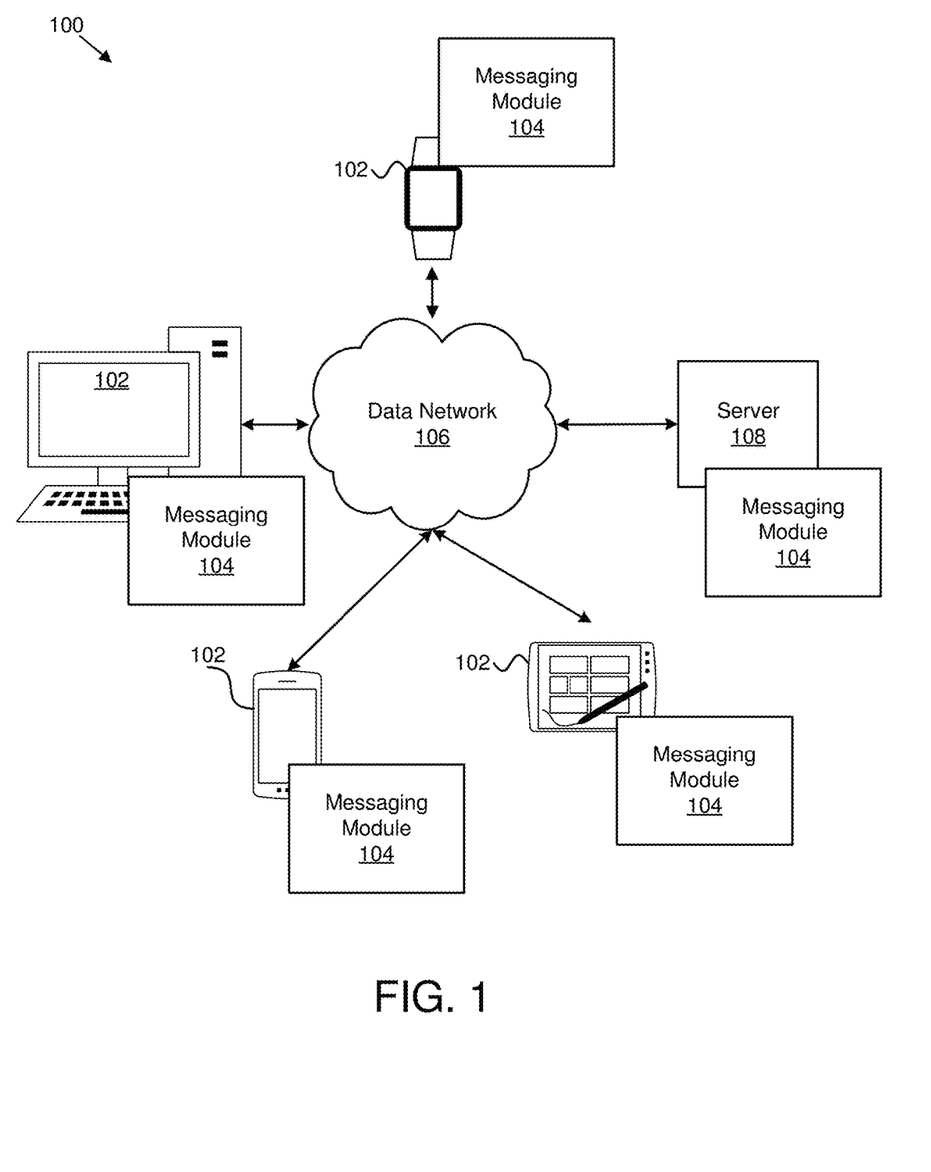
FIG. 1 is a schematic block diagram illustrating one embodiment of a system for blocking group message replies.

FIG. 1 depicts one embodiment of a system 100 for blocking group message replies. In one embodiment, the system 100 includes information handling devices 102, messaging modules 104, data networks 106, and servers 108. Even though a specific number of information handling devices 102, messaging modules 104, data networks 106, and servers 108 are depicted in FIG. 1, one of skill in the art will recognize that any number of information handling devices 102, messaging modules 104, data networks 106, and servers 108 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 and/or the servers 108 may include an embodiment of the messaging module 104. In certain embodiments, the messaging module 104 may receive an indication to block the client application from receiving replies to a group message. The messaging module 104 may also block the client application from receiving the replies to the group message. In this manner, the messaging module 104 may be used to block group message replies. Using this technique, a user receiving a group message may block a messaging application from receiving replies to the group message.

As used herein, messaging may refer to instant messaging, emailing, and/or texting. Accordingly, message may refer to an instant message, an email, and/or a text. Furthermore, a group message may refer to a message sent to multiple recipients, from which any of the multiple recipients may reply by sending another message to the same multiple recipients. The reply that sends another message to the same multiple recipients may be considered a "reply-to-all" message. A group message may include an email string and/or an email thread.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

In one embodiment, the servers 108 include computing devices, such as desktop computers, laptop computers, mainframe computers, cloud servers, virtual servers, and/or the like. In some embodiments, the servers 108 are designed as application servers, email servers, database servers, file servers, game servers, home servers, media servers, web servers, and/or the like. In certain embodiments, the servers 108 store data, and may be designed to be accessed by one or more information handling devices 102 through the network 106. In certain embodiments, the servers 108 may include at least a portion of the messaging module 104 and may perform one or more operations of the messaging module 104.

Figure 2:
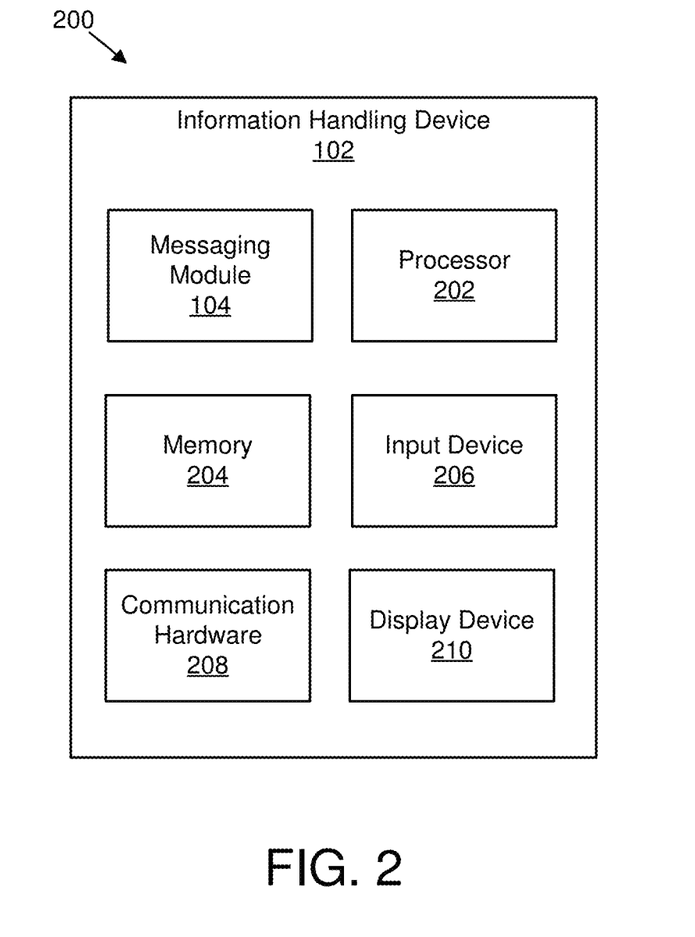
FIG. 2 is a schematic block diagram illustrating one embodiment of an apparatus including an information handling device.

FIG. 2 depicts one embodiment of an apparatus 200 that may be used for blocking group message replies. The apparatus 200 includes one embodiment of the information handling device 102. Furthermore, the information handling device 102 may include the messaging module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the messaging module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to blocking group message replies. In some embodiments, the memory 204 also stores program code and related data, such as an operating system or other controller algorithms operating on the information handling device 102.

The information handling device 102 may use the messaging module 104 for blocking group message replies. As may be appreciated, the messaging module 104 may include computer hardware, computer software, or a combination of both computer hardware and computer software. For example, the messaging module 104 may include circuitry, or a processor, used to block group message replies. As another example, the messaging module 104 may include computer program code that blocks group message replies.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, or the like.

In certain embodiments, the display device 210 includes one or more speakers for producing sound. For example, the display device 210 may produce an audible alert or notification (e.g., a beep or chime) upon blocking a group message. In some embodiments, the display device 210 includes one or more haptic devices for producing vibrations, motion, or other haptic feedback. For example, the display device 210 may produce haptic feedback upon blocking a group message.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the messaging module 104.

Figure 3:
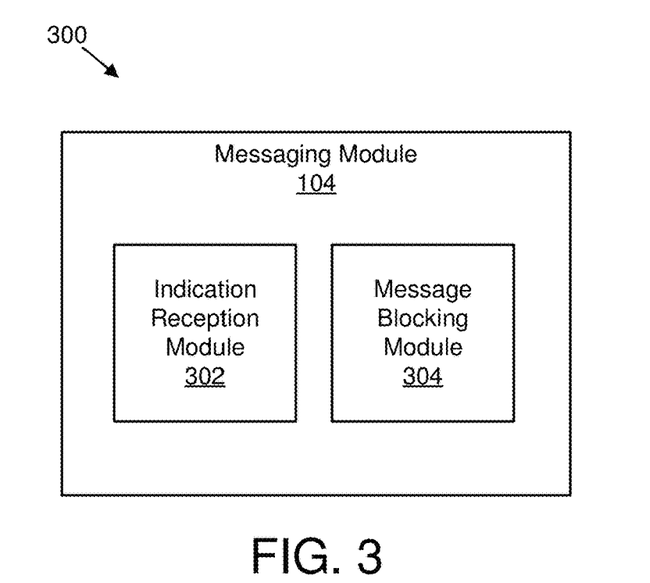
FIG. 3 is a schematic block diagram illustrating one embodiment of an apparatus including a messaging module.

FIG. 3 depicts a schematic block diagram illustrating one embodiment of an apparatus 300 that includes one embodiment of the messaging module 104. Furthermore, the messaging module 104 includes an indication reception module 302 and a message blocking module 304.

The indication reception module 302 may receive an indication (e.g., at a client application, at an additional client application, at a server application) to block the client application from receiving replies to a group message. As described herein, a client application may be an application (e.g., software application, program, etc.) that runs on an information handling device 102 and relies on a server application to perform some operations. In one embodiment, an email client application is an application that enables sending and/or receiving emails using an email server application. In certain embodiments, a client application may be a stand-alone application (e.g., an application only used for messaging). In various embodiments, a client application may be a web browser used to access email, text messages, and/or instant messaging (e.g., chat session).

An indication at a client application may be received in any suitable way, such as by a selection of an input. For example, the indication reception module 302 may receive an indication by way of a selection at an input associated with the group message. The input associated with the group message may be a menu item, an item on a toolbar, a button selection within the message, and so forth. As another example, the indication reception module 302 may receive an indication by way of a selection at an input toolbar of a received email message. As may be appreciated, the input toolbar may be any part of an email message that includes buttons, selectable icons, and/or menu selections. In a further example, the indication reception module 302 may receive a selection of a setting of a received text message. The setting of the text message may be part of a menu setting, a group message setting, and so forth. In one embodiment, the indication reception module 302 may receive an indication from a client application, such as when the messaging module 104 is part of a server application or an additional client application.

In some embodiments, the message blocking module 304 may block the client application from receiving the replies to the group message. It should be noted that by blocking the client application from receiving the replies to the group message, the client application itself does not receive the replies to the group message. Therefore, storage space of the client application is not used, a trash of the client application is not used, a deleted items of the client application is not used, processing power is not used by the information handling device 102 running the client application, a filter of the client application is not used, and/or a macro of the client application is not used to block the client application from receiving the replies to the group message.

In one embodiment, the message blocking module 304 may block the client application from receiving the replies to the group message by removing a user account associated with the client application from a recipient list of the group message. For example, the message blocking module 304 may send an indication to a server application to direct the server application to remove a user account associated with the client application from a recipient list of the group message. As another example, the message blocking module 304 may send an indication to a second client application to direct the second client application to remove a user account associated with the client application from a recipient list of the group message. As yet another example, the messaging blocking module 304 may directly remove a user account associated with the client application from a recipient list of the group message.

As a further example, the message blocking module 304 may send an indication to multiple client applications to direct the multiple client applications to remove a user account associated with the client application from a recipient list of the group message. In such an example, sending the indication to the multiple client applications may include directing the multiple client applications to notify the recipient list of the group message that the user account is removed from the group message. In this example, all recipients may be able to tell that the user account is removed from the group message. Such notification may be done in any suitable way, such as by highlighting the user account information in the message, changing the color of the user account information in the message, changing a font feature of the user account information in the message, sending a separate message to the recipient list that the user account is no longer receiving replies to the group message, and so forth.

In another example, sending the indication to the multiple client applications may include directing the multiple client applications to block notification of the recipient list of the group message that the user account is removed from the group message. In such an example, the recipient list may be unaware that the user account is removed from the group message.

In certain embodiments, the message blocking module 304 may block the client application from receiving the replies to the group message by adding a user account associated with the client application to an exclude list corresponding to the group message. For example, the message blocking module 304 may block the client application from receiving the replies to the group message by sending an indication to a server application to direct the server application to add a user account associated with the client application to an exclude list corresponding to the group message.

As another example, the message blocking module 304 may block the client application from receiving the replies to the group message by sending an indication to a second client application to direct the second client applications to add a user account associated with the client application to an exclude list corresponding to the group message. As a further example, the message blocking module 304 may block the client application from receiving the replies to the group message by sending an indication to multiple client applications to direct the multiple client applications to add a user account associated with the client application to an exclude list corresponding to the group message. As yet another example, the messaging blocking module 304 may directly add a user account associated with the client application to an exclude list corresponding to the group message.

In certain embodiments, the blocking module 304 may send an indication by sending a message, such as an email or text message, to the recipients of the group message. The message may include a field, such as a properties field and/or an opt-out field that a receiving application may interpret in order to block the client application from receiving replies to the group message.

Figure 4:
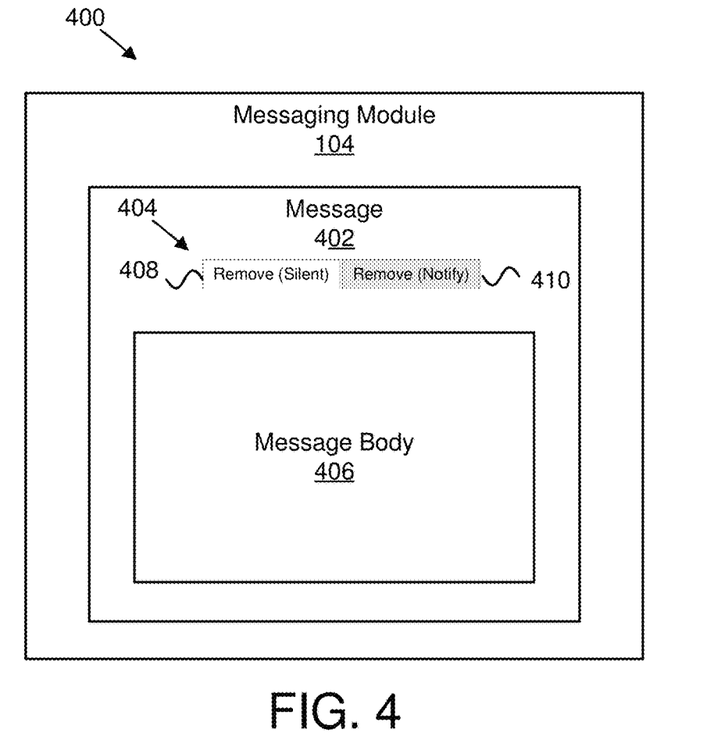
FIG. 4 is a schematic block diagram illustrating another embodiment of an apparatus including a messaging module.

FIG. 4 is a schematic block diagram illustrating another embodiment of an apparatus 400 that includes one embodiment of the messaging module 104. Furthermore, the messaging module 104 includes a message 402, such as an email message, a text message, or an instant message. In the illustrated embodiment, the message 402 may be a group message having multiple recipients. In certain embodiments, the messaging module 104 may be part of a client application.

The message 402 includes a toolbar 404 and a message body 406. As may be appreciated, the toolbar 404 is one embodiment of input options available to indicate that the client application that includes the message 402 is to block receipt of replies to the message 402. The message body 406 includes the contents of a message sent to multiple recipients.

As illustrated, the toolbar 404 further includes a silent remove option 408 and a notify remove option 410. By selecting the silent remove option 408, the client application may send a message indicating that the user account associated with the client application is to be removed from the group message without notifying the other recipients of the group message that the user account has been removed from replies to the group message. In contrast, by selecting the notify remove option 410, the client application may send a message indicating that the user account associated with the client application is to be removed from the group message and that the recipients of the group message are to be notified that the user account has been removed from replies to the group message. While two remove options are included in the toolbar 404, other embodiments may include fewer or more remove options. For example, in one embodiment, there may only be one remove option. In such an example, an option to silently remove or notify remove may be presented to the user upon selection of the remove option.

Figure 5:
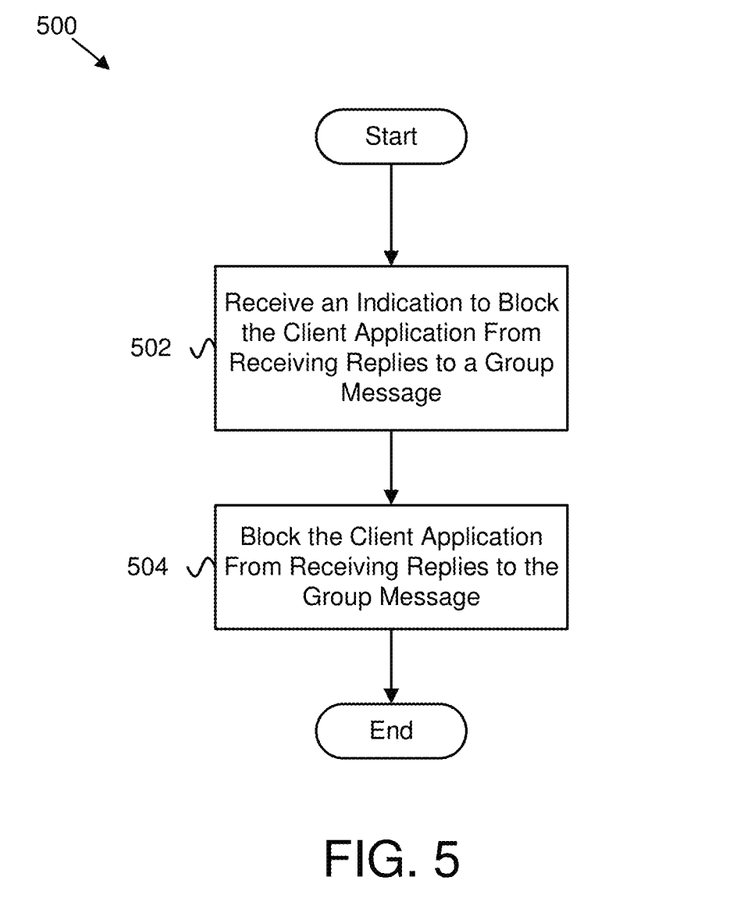
FIG. 5 is a schematic flow chart diagram illustrating an embodiment of a method for blocking group message replies.

FIG. 5 is a schematic flow chart diagram illustrating an embodiment of a method 500 for blocking group message replies. In some embodiments, the method 500 is performed by an apparatus, such as the information handling device 102. In other embodiments, the method 500 may be performed by a module, such as the messaging module 104. In certain embodiments, the method 500 may be performed by a processor executing program code, for example, a microcontroller, a microprocessor, a CPU, a GPU, an auxiliary processing unit, a FPGA, or the like.

The method 500 may include receiving 502 an indication to block the client application from receiving replies to a group message. In certain embodiments, the indication reception module 302 may receive 502 the indication to block the client application from receiving replies to the group message. In various embodiments, receiving 502 the indication to block the client application includes receiving the indication at the client application. In some embodiments, receiving 502 the indication to block the client application includes receiving the indication at an additional client application. In certain embodiments, receiving 502 the indication to block the client application includes receiving the indication at a server application. In some embodiments, receiving 502 the indication to block the client application from receiving replies to the group message includes receiving a selection at an input associated with the group message. In certain embodiments, receiving 502 the indication to block the client application from receiving replies to the group message includes receiving a selection at an input toolbar of a received email message. In various embodiments, receiving 502 the indication to block the client application from receiving replies to the group message includes receiving a selection of a setting of a received text message.

The method 500 may also include blocking 504 the client application from receiving the replies to the group message, and the method 500 may end. In certain embodiments, the message blocking module 304 may block 504 the client application from receiving the replies to the group message. In one embodiment, blocking 504 the client application from receiving the replies to the group message includes removing a user account associated with the client application from a recipient list of the group message. In another embodiment, blocking 504 the client application from receiving the replies to the group message includes adding a user account associated with the client application to an exclude list corresponding to the group message.

In some embodiments, blocking 504 the client application from receiving the replies to the group message includes sending the indication to a server application to direct the server application to remove a user account associated with the client application from a recipient list of the group message. In certain embodiments, blocking 504 the client application from receiving the replies to the group message includes sending the indication to a server application to direct the server application to add a user account associated with the client application to an exclude list corresponding to the group message. In various embodiments, blocking 504 the client application from receiving the replies to the group message includes sending the indication to a second client application to direct the second client application to remove a user account associated with the client application from a recipient list of the group message.

In one embodiment, blocking 504 the client application from receiving the replies to the group message includes sending the indication to a second client application to direct the second client applications to add a user account associated with the client application to an exclude list corresponding to the group message. In some embodiments, blocking 504 the client application from receiving the replies to the group message includes sending the indication to multiple client applications to direct the multiple client applications to remove a user account associated with the client application from a recipient list of the group message.

In certain embodiments, sending the indication to the multiple client applications includes directing the multiple client applications to notify the recipient list of the group message that the user account is removed from the group message. In various embodiments, sending the indication to the multiple client applications includes directing the multiple client applications to block notification of the recipient list of the group message that the user account is removed from the group message. In one embodiment, blocking 504 the client application from receiving the replies to the group message includes sending the indication to multiple client applications to direct the multiple client applications to add a user account associated with the client application to an exclude list corresponding to the group message.

Figure 6:
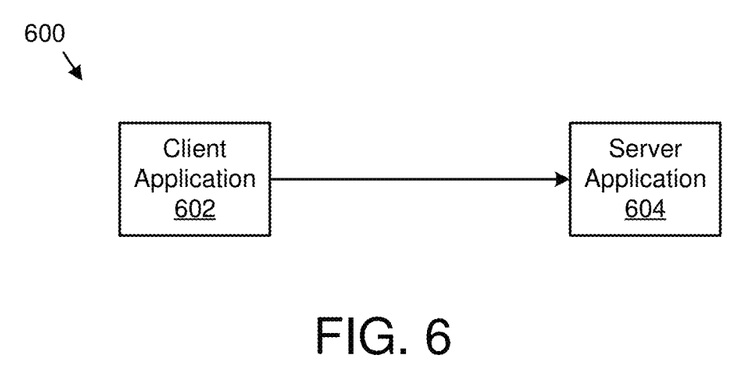
FIG. 6 is a schematic block diagram illustrating one embodiment of a communication system for blocking group message replies.

FIG. 6 is a schematic block diagram illustrating one embodiment of a communication system 600 for blocking group message replies. The communication system 600 includes a client application 602 and a server application 604. The client application 602 includes the messaging module 104. In the illustrated embodiment, the client application 602 sends a request (e.g., an indication) to the server application 604 to remove a user account associated with the client application 602 from a group message. Accordingly, the server application 604 may remove the user account from the group message so that the client application 602 will not receive replies to the group message. In certain embodiments, the server application 604 may remove the user account from the group message, while in other embodiments, the server application 604 may add the user account to an exclude list in order to block the client application 602 from receiving replies to the group message. As may be appreciated, this type of embodiment may work in an environment in which all recipients of the group message have messaging accounts associated with the server application 604, such as may occur in a business environment.

Figure 7:
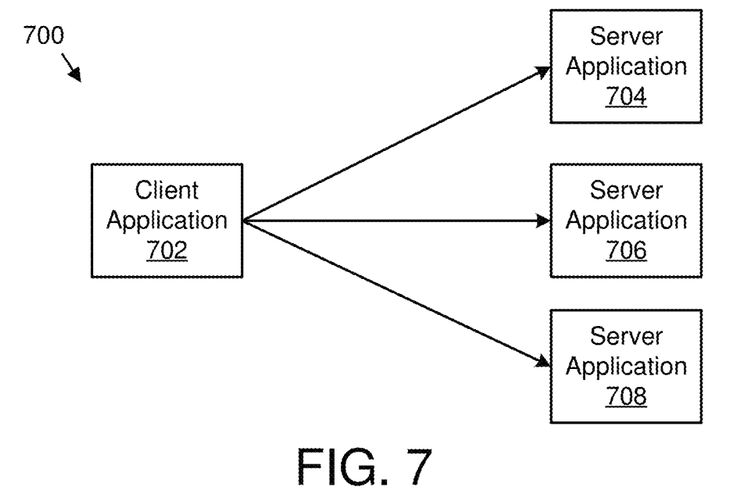
FIG. 7 is a schematic block diagram illustrating another embodiment of a communication system for blocking group message replies.

FIG. 7 is a schematic block diagram illustrating another embodiment of a communication system 700 for blocking group message replies. The communication system 700 includes a client application 702 and multiple server applications 704, 706, and 708. It should be noted that although three server applications 704, 706, and 708 are illustrated in this embodiment, other embodiments may include fewer or more server applications.

The client application 702 includes the messaging module 104. In the illustrated embodiment, the client application 702 sends a request (e.g., an indication) to each of the server applications 704, 706, and 708 to remove a user account associated with the client application 702 from a group message. Accordingly, the server applications 704, 706, and 708 may remove the user account from the group message so that the client application 702 will not receive replies to the group message. In certain embodiments, the server applications 704, 706, and 708 may remove the user account from the group message, while in other embodiments, the server applications 704, 706, and 708 may add the user account to an exclude list in order to block the client application 702 from receiving replies to the group message. As may be appreciated, this type of embodiment may work in an environment in which recipients of the group message have messaging accounts associated with multiple server applications.

Figure 8:
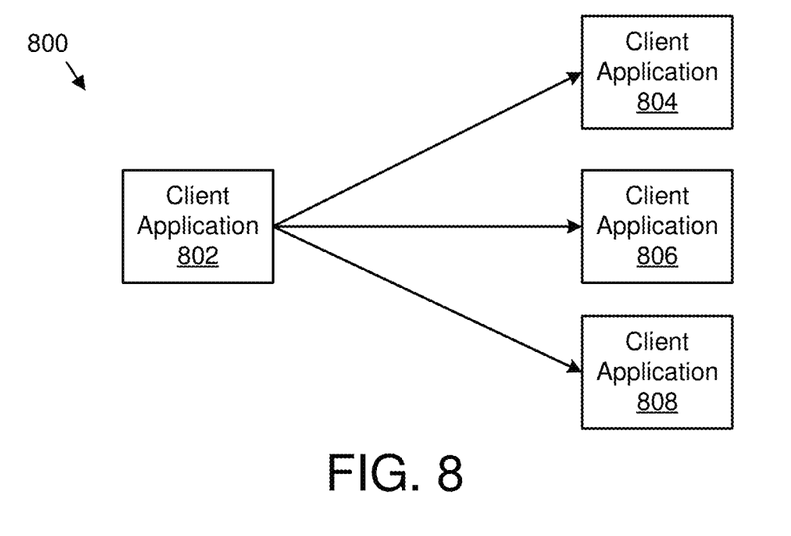
FIG. 8 is a schematic block diagram illustrating a further embodiment of a communication system for blocking group message replies.

FIG. 8 is a schematic block diagram illustrating a further embodiment of a communication system 800 for blocking group message replies. The communication system 800 includes a client application 802 and multiple additional client applications 804, 806, and 808. It should be noted that although three additional client applications 804, 806, and 808 are illustrated in this embodiment, other embodiments may include fewer or more additional client applications. Indeed, the number of additional client applications may correspond directly to a number that is one less than a number of recipients of the group message.

The client application 802 includes the messaging module 104. In the illustrated embodiment, the client application 802 sends a request (e.g., an indication) to each of the additional client applications 804, 806, and 808 to remove a user account associated with the client application 802 from a group message. Accordingly, the additional client applications 804, 806, and 808 may remove the user account from the group message so that the client application 802 will not receive replies to the group message. In certain embodiments, the additional client applications 804, 806, and 808 may remove the user account from the group message, while in other embodiments, the additional client applications 804, 806, and 808 may add the user account to an exclude list in order to block the client application 802 from receiving replies to the group message.

Figure 9:
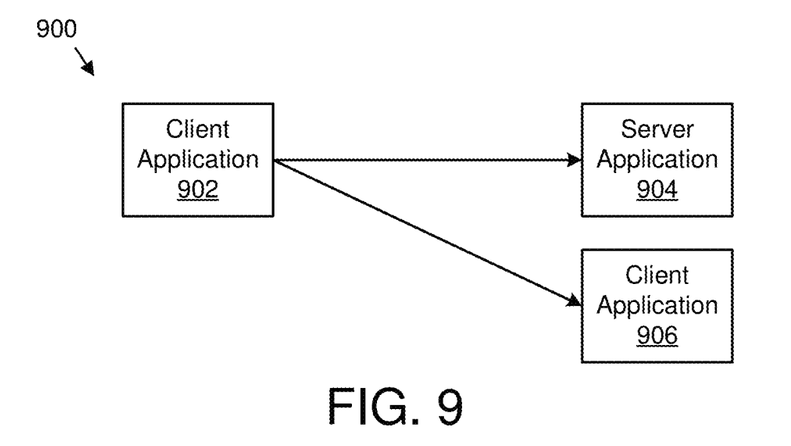
FIG. 9 is a schematic block diagram illustrating yet another embodiment of a communication system for blocking group message replies.

FIG. 9 is a schematic block diagram illustrating yet another embodiment of a communication system 900 for blocking group message replies. The communication system 900 includes a client application 902, a server application 904, and a client application 906. It should be noted that although only one server application 904 and only one client application 906 are illustrated in this embodiment, other embodiments may include more server applications and/or client applications.

The client application 902 includes the messaging module 104. In the illustrated embodiment, the client application 902 sends a request (e.g., an indication) to the server application 904 and the client application 906 to remove a user account associated with the client application 902 from a group message. Accordingly, the server application 904 and the client application 906 may remove the user account from the group message so that the client application 902 will not receive replies to the group message. In certain embodiments, the server application 904 and the client application 906 may remove the user account from the group message, while in other embodiments, the server application 904 and the client application 906 may add the user account to an exclude list in order to block the client application 902 from receiving replies to the group message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
receive an indication in a group message at a client application to block the client application from receiving replies to the group message using an option selected by a user, wherein the client application comprises a messaging application, the group message comprises a toolbar and a message body, the toolbar comprises a silent remove option and a notify remove option separately selectable directly from the toolbar, the silent remove option results in a plurality of client applications removing a user account associated with the client application without notifying a recipient list of the group message that the user account is removed from the recipient list, and the notify remove option results in the plurality of client applications removing the user account associated with the client application and notifying the recipient list of the group message that the user account is removed from the recipient list; and
block the client application from receiving the replies to the group message.

2. The apparatus of claim 1, wherein the code executable by the processor to receive the indication at the client application to block the client application from receiving replies to the group message further comprises code executable by the processor to receive a selection at an input associated with the group message.

3. The apparatus of claim 1, wherein the code executable by the processor to block the client application from receiving the replies to the group message further comprises code executable by the processor to remove the user account associated with the client application from the recipient list of the group message.

4. The apparatus of claim 1, wherein the code executable by the processor to block the client application from receiving the replies to the group message further comprises code executable by the processor to add the user account associated with the client application to an exclude list corresponding to the group message.

5. A method comprising:
receiving, by use of a processor, an indication in a group message at a client application to block the client application from receiving replies to the group message using an option selected by a user, wherein the client application comprises a messaging application, the group message a toolbar and a message body, the toolbar comprises a silent remove option and a notify remove option separately selectable directly from the toolbar, the silent remove option results in a plurality of client applications removing a user account associated with the client application without notifying a recipient list of the group message that the user account is removed from the recipient list, and the notify remove option results in the plurality of client applications removing the user account associated with the client application and notifying the recipient list of the group message that the user account is removed from the recipient list; and
blocking the client application from receiving the replies to the group message.

6. The method of claim 5, wherein receiving the indication at the client application to block the client application from receiving replies to the group message comprises receiving a selection at an input associated with the group message.

7. The method of claim 5, wherein receiving the indication at the client application to block the client application from receiving replies to the group message comprises receiving a selection at an input toolbar of a received email message.

8. The method of claim 5, wherein receiving the indication at the client application to block the client application from receiving replies to the group message comprises receiving a selection of a setting of a received text message.

9. The method of claim 5, wherein blocking the client application from receiving the replies to the group message comprises removing the user account associated with the client application from the recipient list of the group message.

10. The method of claim 5, wherein blocking the client application from receiving the replies to the group message comprises adding the user account associated with the client application to an exclude list corresponding to the group message.

11. The method of claim 5, wherein blocking the client application from receiving the replies to the group message comprises sending the indication to a server application to direct the server application to remove the user account associated with the client application from the recipient list of the group message.

12. The method of claim 5, wherein blocking the client application from receiving the replies to the group message comprises sending the indication to a server application to direct the server application to add the user account associated with the client application to an exclude list corresponding to the group message.

13. The method of claim 5, wherein blocking the client application from receiving the replies to the group message comprises sending the indication to a second client application to direct the second client application to remove the user account associated with the client application from the recipient list of the group message.

14. The method of claim 5, wherein blocking the client application from receiving the replies to the group message comprises sending the indication to a second client application to direct the second client applications to add the user account associated with the client application to an exclude list corresponding to the group message.

15. The method of claim 5, wherein blocking the client application from receiving the replies to the group message comprises sending the indication to the plurality of client applications to direct the plurality of client applications to remove the user account associated with the client application from the recipient list of the group message.

16. The method of claim 15, wherein sending the indication to the plurality of client applications comprises directing the plurality of client applications to notify the recipient list of the group message that the user account is removed from the group message.

17. The method of claim 15, wherein sending the indication to the plurality of client applications comprises directing the plurality of client applications to block notification of the recipient list of the group message that the user account is removed from the group message.

18. The method of claim 5, wherein blocking the client application from receiving the replies to the group message comprises sending the indication to the plurality of client applications to direct the plurality of client applications to add the user account associated with the client application to an exclude list corresponding to the group message.

19. A program product comprising a non-transitory computer readable storage medium that stores code executable by a processor, the executable code comprising code to perform:
receiving an indication in a group message at a client application to block the client application from receiving replies to the group message using an option selected by a user, wherein the client application comprises a messaging application, the group message a toolbar and a message body, the toolbar comprises a silent remove option and a notify remove option separately selectable directly from the toolbar, the silent remove option results in a plurality of client applications removing a user account associated with the client application without notifying a recipient list of the group message that the user account is removed from the recipient list, and the notify remove option results in the plurality of client applications removing the user account associated with the client application and notifying the recipient list of the group message that the user account is removed from the recipient list; and
blocking the client application from receiving the replies to the group message.

20. The program product of claim 19, wherein the code to perform blocking the client application from receiving the replies to the group message further comprises code to perform removing the user account associated with the client application from the recipient list of the group message.

21. A method comprising:
receiving, by use of a processor, an indication in a group message from a client application to block the client application from receiving replies to the group message using an option selected by a user, wherein the client application comprises a messaging application, the group message a toolbar and a message body, the toolbar comprises a silent remove option and a notify remove option separately selectable directly from the toolbar, the silent remove option results in a plurality of client applications removing a user account associated with the client application without notifying a recipient list of the group message that the user account is removed from the recipient list, and the notify remove option results in the plurality of client applications removing the user account associated with the client application and notifying the recipient list of the group message that the user account is removed from the recipient list; and blocking the client application from receiving the replies to the group message.

22. The method of claim 21, wherein receiving the indication from the client application comprises receiving, at a server application, the indication from the client application.

23. The method of claim 21, wherein receiving the indication from the client application comprises receiving, at an additional client application, the indication from the client application.

* * * * *